United States Patent [19]

Ohlmeyer et al.

[11] Patent Number: 4,756,891

[45] Date of Patent: Jul. 12, 1988

[54] METHOD FOR PRE-HEATING COMBUSTION AIR AND FOR CATALYTICALLY REDUCING NOXIOUS SUBSTANCES IN FLUE GAS

[75] Inventors: Manfred Ohlmeyer, Eggenstein-Leopoldshafen; Martin Benzel, Aachen, both of Fed. Rep. of Germany

[73] Assignee: Kernforschungszentrum Karlsruhe GmbH, Karlsruhe, Fed. Rep. of Germany

[21] Appl. No.: 919,708

[22] Filed: Oct. 16, 1986

[30] Foreign Application Priority Data

Oct. 17, 1985 [DE] Fed. Rep. of Germany ....... 3536958

[51] Int. Cl.$^4$ .......................... B01J 8/00; C01B 21/00
[52] U.S. Cl. .................................. 423/239; 423/235; 423/244
[58] Field of Search .............. 423/244 A, 235, 235 D, 423/239 A, 239 R

[56] References Cited

U.S. PATENT DOCUMENTS 4,602,673 7/1986 Michelfelder et al. ............. 423/239

FOREIGN PATENT DOCUMENTS 2755314 9/1979 Fed. Rep. of Germany .
3335917A1 2/1985 Fed. Rep. of Germany .
3536958 11/1986 Fed. Rep. of Germany .

Primary Examiner—Gregory A. Heller
Attorney, Agent, or Firm—Spencer & Frank

[57] ABSTRACT

An apparatus and a method of pre-heating combustion air and catalytically reducing noxious substances in flue gas employing a two-part heat-exchanger which is traversed from top to bottom by a plurality of catalytically active separately movable heat-storage elements are described. The combustion gas is heated in a first portion of the heat-exchanger by heat transferred from the heat-storage elements and the noxious gases are catalytically reduced in a second portion of the heat-exchanger downstream from the first portion in the path of the elements in the presence of ammonia and catalytically active heat-storage elements. The catalyst-coated heat-storage elements can be removed from circulation and replaced by unspent or regenerated elements when the residual content of noxious substances in the flue gas remains elevated.

6 Claims, 4 Drawing Sheets

METHOD FOR PRE-HEATING COMBUSTION AIR AND FOR CATALYTICALLY REDUCING NOXIOUS SUBSTANCES IN FLUE GAS

BACKGROUND OF THE INVENTION

1. Field of the Invention

The present invention relates to a method and apparatus for pre-heating combustion air and catalytically reducing noxious substances in flue gas.

2. Description of the Background

DE-OS No. 3,335,917 disclosed a pre-heater for air having a regenerative or recuperative configuration. In the prior art apparatus, the surface of the heat-exchanger elements on the flue gas side are provided with a coating which acts as a catalyst for $NO_x$ reduction. The regenerative air pre-heater shown in FIG. 5 of that publication includes a rotating drum and is equipped for radial gas influx. In this prior art apparatus, the heat-storage substance is composed of a plurality of individual movable elements in the form of spheres, e.g., hollow spheres or saddle-shaped bodies, which are provided with a catalyst coating. The drum is subdivided radially into individual chambers so as to accommodate the individual elements. This integration of the $NO_x$ reactor into the air pre-heater serves primarily to reduce the space requirement of the system. According to FIG. 6 of the reference, a first air pre-heater with the shape of a tube or plate and a second air pre-heater are connected in series in the manner of a heat-exchange column. The heat-exchange column includes a storage substance composed of a plurality of separately movable elements which are turned by a transporting device. However, only the heat-exchange elements of the plate- or tube-shaped heat-exchanger are provided with a catalyst coating. In both cases, the elements coated with the catalyst layer form static or quasistatic components. Due to their decreasing catalytic activity over their service life, these elements must be considerably larger than would be necessary in theory to attain a service life which is economically justifiable for the operation of a power plant, e.g., up to three years. For example, a catalyst subdivided into three layers will have an average service life of only about 1.3 years per layer. This is the case even if it is coated with a substance roughly 35% above the theoretical requirement. In addition, the entire system must be shut down after reaching its lower activity limit for the exchange or partial exchange of the catalyst-coated elements.

SUMMARY OF THE INVENTION

It is an object of the present invention to prevent a decrease in catalytic activity within such systems and reduce even further the space requirement of such systems.

The above and other objects of the invention are attained by a method of continuously pre-heating combustion air and catalytically reducing noxious substances in flue gas. The method comprises passing through a first portion and a second portion of a heat-exchanger a plurality of groups of heated separately movable heat-storage elements differing from each other in at least one significant characteristic on the basis of which these groups can be separated from one another, said heated elements comprising catalytically active catalyst-coated heat-storage elements; passing combustion air through said first portion of said heat-exchanger to transfer heat from said elements to said air, and passing heated flue gas containing noxious substances and ammonia through said second portion of said heat-exchanger to transfer heat from said flue gas to said elements while simultaneously catalytically reducing said noxious substances, said air and said flue gas flowing in a direction transverse to the direction of the flow of said elements and substantially in the absence of leakages of air and flue gas between said first portion and said second portion of said heat-exchanger; and removing said elements from said second portion of said heat-exchanger and reintroducing said elements into said first portion of said heat-exchanger, said step of removing including disposing of elements of one group removed from said heat-exchanger and substituting therefor unspent or regenerated elements of a different one of said groups as a function of the content of noxious substances in the flue gas flowing out of said heat-exchanger.

The above and other objects are also attained by providing an apparatus for continuously pre-heating combustion air and catalytically reducing noxious substances in flue gas, comprising a heat-exchanger housing having a first part and a second part and gas-permeable interior walls provided to contain and permit the flow of a plurality of separately movable heat-storage elements comprising catalyst-coated heat-storage elements, and a means providing a constrictive passage for the elements, said constrictive means operatively connected onto said first part and said second part of said housing, said first part of said housing having an inlet for said elements and an inlet and an outlet for said air and said second part of said housing having an outlet for said elements and an inlet and an outlet for said flue gas; means for removal of said elements from the outlet for said elements and resupply of said elements to the inlet for said elements, the inlet and the outlet for said elements defining a first direction of flow of said elements which is transverse to a second direction of flow of said air and said flue gas; and discharge means for said elements provided with a means for separating said elements by size, shape or weight, said discharge means being operatively connected to said second part of said housing and to said removal and resupply means at the outlet for said elements.

Figure 1:
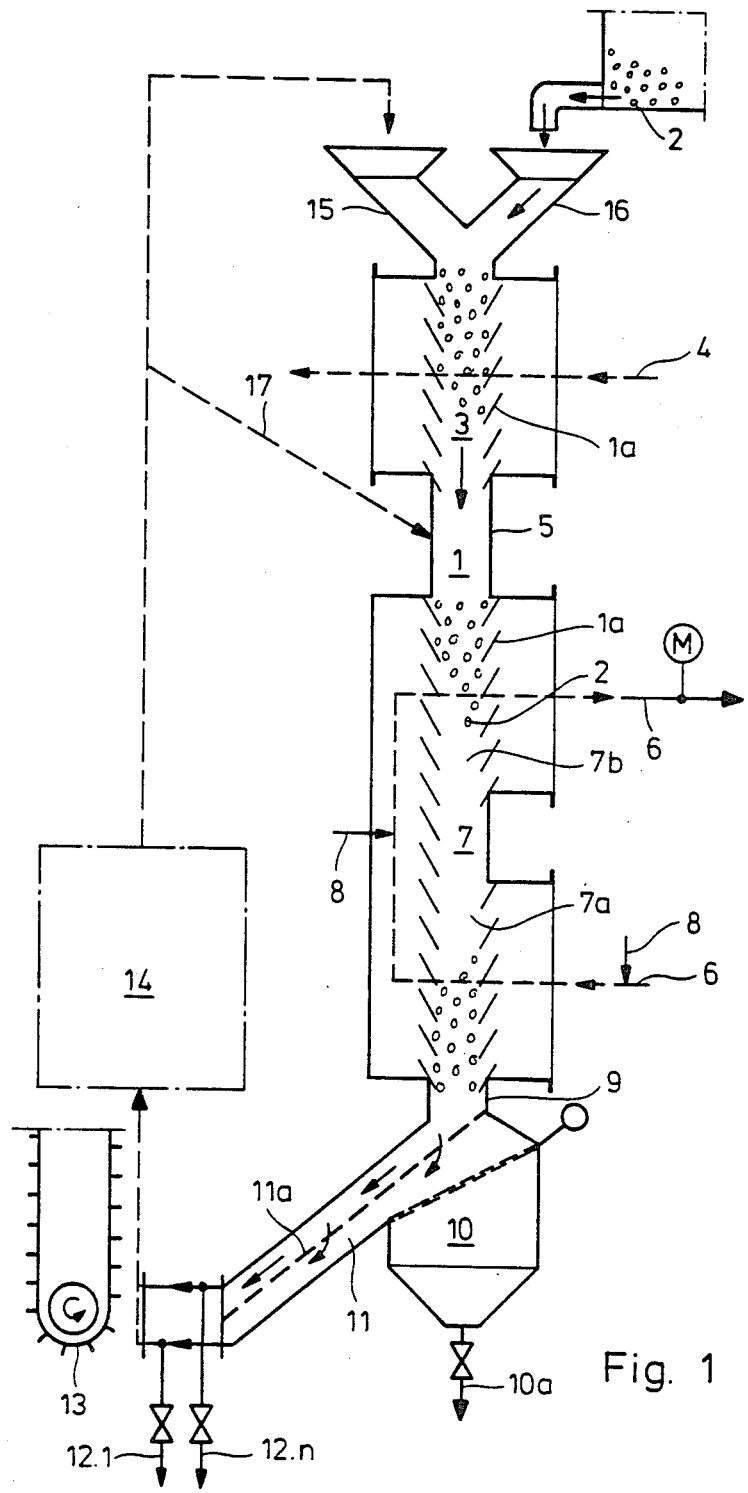
FIG. 1 is a schematic longitudinal section of an apparatus for pre-heating combustion air and catalytically reducing noxious substances combined with a device for the turnover of the heat-storage elements according to the invention.

Other objects, advantages and features of the present invention will become apparent to those skilled in the art from the following discussion.

DESCRIPTION OF THE INVENTION

The present invention makes it possible to design the portion of the heat-exchanger charged with the flue gas only barely above the theoretical value for the required catalyst substance. If catalyst activity decreases somewhat, the spent catalytically-coated heat-storage elements are replaced by new ones without interrupting the operation of the system until the complete original activity has been attained again. By providing a classification according to size, shape or weight, care is taken that only spent elements of a certain type are removed while new fresh elements of another type are filled in.

These processes are advisably controlled as a function of the residual content of noxious substances, e.g., $NO_x$ (~200 mg/m$^3$) and $NH_3$ (~5 Vpm), in the flue gas once it leaves the system. In this way it is assured that the content of residual noxious substances is kept as low as possible, particularly below given limits. The spent heat-storage elements can be regenerated after removal and then reused again. Moreover, in the course of the turnover, the individual elements can be subjected to a cleaning process, e.g., by shaking, after they have been removed from the heat-exchanger section charged with flue gas.

The invention will now be described in greater detail with reference to an embodiment thereof which is illustrated in the drawing figures.

DESCRIPTION OF THE PREFERRED EMBODIMENTS

The two-part heat-exchanger 1 having gas permeable interior walls 1a as shown in FIG. 1 is traversed from top to bottom by a plurality of separately movable heat-storage elements 2 which may have, e.g., a spherical shape and at least a catalytically-coated part thereof. The combustion air 4 flows through the upper part 3 (LUVO, pre-heater) of heat-exchanger 1 in a simple cross-flow and is thereby heated, for example from 20° to 200° C., while the heat-storage elements cool correspondingly from 320° C. down to 160° C. Then heat-storage elements 2 are also added from the filling device 16 which contains new or regenerated elements 2. The heat-storage elements travel through a tight lock 5 with the same cross section as the heat-exchanger parts 3 and 7 and which prevents leakage streams between the combustion air 4 and the flue gas 6. The elements 2 then travel to the lower part 7 of heat-exchanger 1 where the noxious substances ($NO_x$) contained in the flue gas are reduced in the presence of ammonia 8, and the flue gas 6 is thus cooled from, e.g., 350° C. to 180° C., while simultaneously the storage elements are correspondingly heated from 160° C. up to 320° C.

The reduction of noxious substances can be optimized by providing multiple charges in the lower portion 7 of heat-exchanger 1. This can be attained while setting up various temperature levels 7a (240° to 320° C.), 7b (160° to 240° C.), providing the heat-storage elements 2 with different catalytic coatings adapted to the temperature levels 7a, 7b and adding a corresponding quantity of ammonia 8. Multiple charges can be provided, e.g., in a cross countercurrent as is shown in FIG. 1. After leaving the lower heat-exchanger 7 the flue gas 6 is fed to cleaning devices such as electric filters and flue gas desulfuring devices to conduct the corresponding processes (not shown).

After passing through heat-exchanger 1, the heat-storage elements 2 are conducted from the lower end of the heat-exchanger 1 through a discharge station 9 and a cleaning device 10 with a dust removal device 10a to a sorting device 11 equipped with a grate 11a. Thereafter, the heat-storage elements 2 are conducted past removal devices 12.1 to 12.n through a turnover device 13 and then back to the top where they are reintroduced into the upper part 3 of heat-exchanger 1 through the filling device 15 for the circulating heat-storage elements 2.

Figure 3:
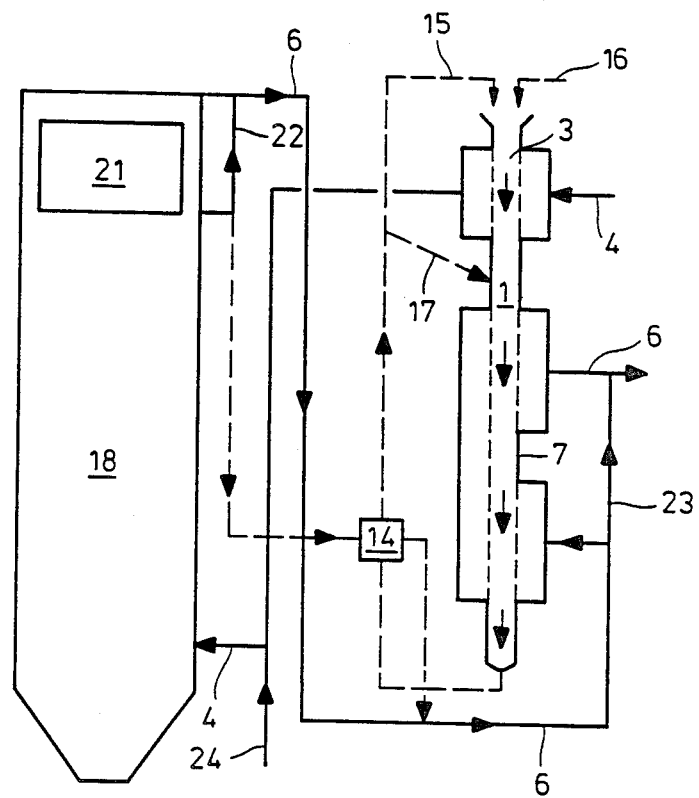
FIG. 3 is a schematic longitudinal diagram showing a preferred connection according to FIG. 2, employing the present invention as shown in FIG. 1.

Stabilized temperature levels can be maintained in the lower part 7 of heat-exchanger 1 by means of a heating device 14 and by way of direct or indirect heating of the heat-storage elements 2 even if there is only a partial load and the boiler system 18 is in the start-up state (FIG. 3).

The following can be added to the process in conjunction with the use of a by-pass 17 to avoid the upper part of the heat-exchanger 3, preferably when the process is conducted with a partial load or is in the start-up stage. The temperature levels in 3 and 7 may be varied while maintaining the same transfer of heat in 3 and 7 to preserve optimum temperatures, e.g., in 7a and 7b, for catalytic reduction even if there are variations in the load. For this purpose, part of the elements 2 are re-introduced through by-pass 17 of lock 5 between the upper part 3 and the lower part 7 of heat-exchanger 1 while the remainder of elements 2 are re-introduced at 15.

In the present process, the catalytic effect of the coated heat-exchanger elements 2 persists longer than in static systems due to the self-cleaning effect produced by the constant circulation in the heat-exchanger. However, it is necessary to constantly renew some of the heat-storage elements in order to maintain the reduction of noxious substances constant over time. To avoid that, during the constant circulation of heat-storage elements, newly supplied heat-storage elements are removed right away and a class of heat-storage elements different from the class to be removed by removal devices 12.1 to 12.n is fed in at 16. Thus, replenishment takes place by way of a level regulation in the case of abrasion or the like. This is important since under average conditions the heat-storage elements may be assumed to circulate through the system one to three times per hour. In the simplest case, heat-exchange elements 2 have a spherical shape where the individual classes differ from one another by having different sphere diameters.

A sorting device 11 is provided with one or more grates 11a which separates spheres having different diameters and thus supplies them in classified order to the respective removal devices 12.1 to 12.n by means of which they can be removed.

The removal process taking place at devices 12.1 to 12.n and the addition of new spheres at 16 is regulated by a measuring station M which measures the residual content of noxious substances in flue gas 6, once the latter has left heat-exchanger part 7.

It is assumed that when placed in service the system is filled with ceramic or metal based heat-storage elements having a uniform diameter x of an order of magnitude between about 15 and 35 mm. Then, the supply is supplemented at 16 with heat-storage elements having a diameter of x+y and, if necessary, only heat-storage elements having a diameter of x are removed at 12. If all of the x elements have been removed, a change is made, i.e. x+y is removed and x is refilled from the supply. The procedure is analogous if there are two or more different types of heat-storage elements 2. For example, if elements having diameters x and x+y are removed, elements having diameters x+a and x+b are introduced. Later on, x and x+y elements are introduced and x+a and x+b elements are withdrawn. This example shows that many possible variations can be implemented while practicing the method according to the invention.

Figure 2:
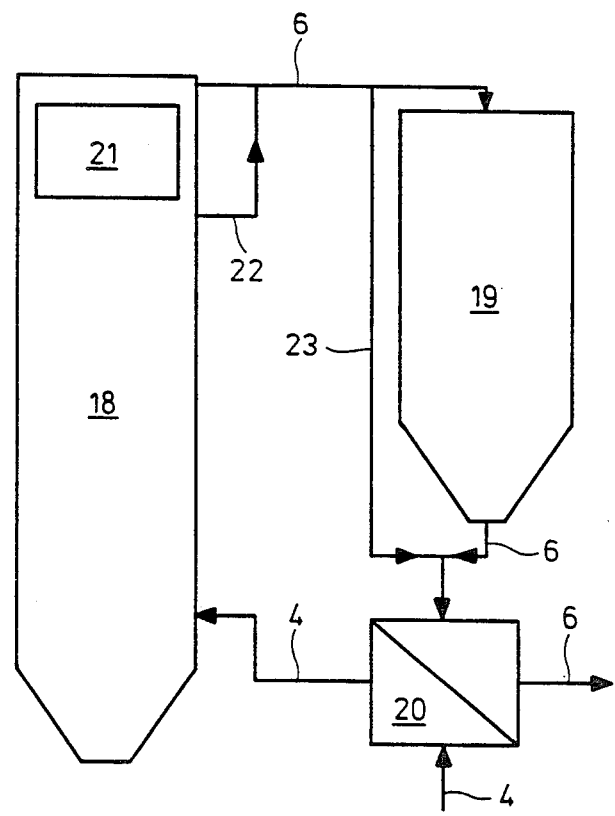
FIG. 2 is a schematic longitudinal diagram of the previously customary connection of an air pre-heater and catalyst downstream of a boiler system.

FIG. 2 shows a typical prior art connection of a catalyst 19 (static system) and an air pre-heater 20 (conventional design) downstream of a boiler system 18. As can be seen, a change in the temperature level in the air pre-heater 20 has no influence on the catalyst 19 since the air-pre-heater 20 lies downstream of the catalyst 19 in the stream of the flue gas 6. The operating temperatures can only be influenced when the process is conducted at partial load or is at the starting stage by using a water supply pre-heater by-pass 22 which avoids the water supply pre-heater 21 and/or by using a by-pass 23 which avoids the catalyst 19.

FIG. 3 shows the installation of the apparatus according to the invention which has a heat-exchanger 1 instead of a catalyst 19 and an air pre-heater 20. In addition to reducing the space requirement, this substitution also broadens and thus improves the possibilities for influencing the temperature of catalytic reduction during partial load operation and at the starting stage.

As shown in FIG. 2, this was possible in the past only by incorporating the water supply heater by-pass 22 and the catalyst by-pass 23. The present invention provides as individual or combined alternatives the additional possibilities of incorporating an air pre-heater by-pass 24, a heat-storage element by-pass 17 and a heat-storage element heating device 14.

Figure 4:
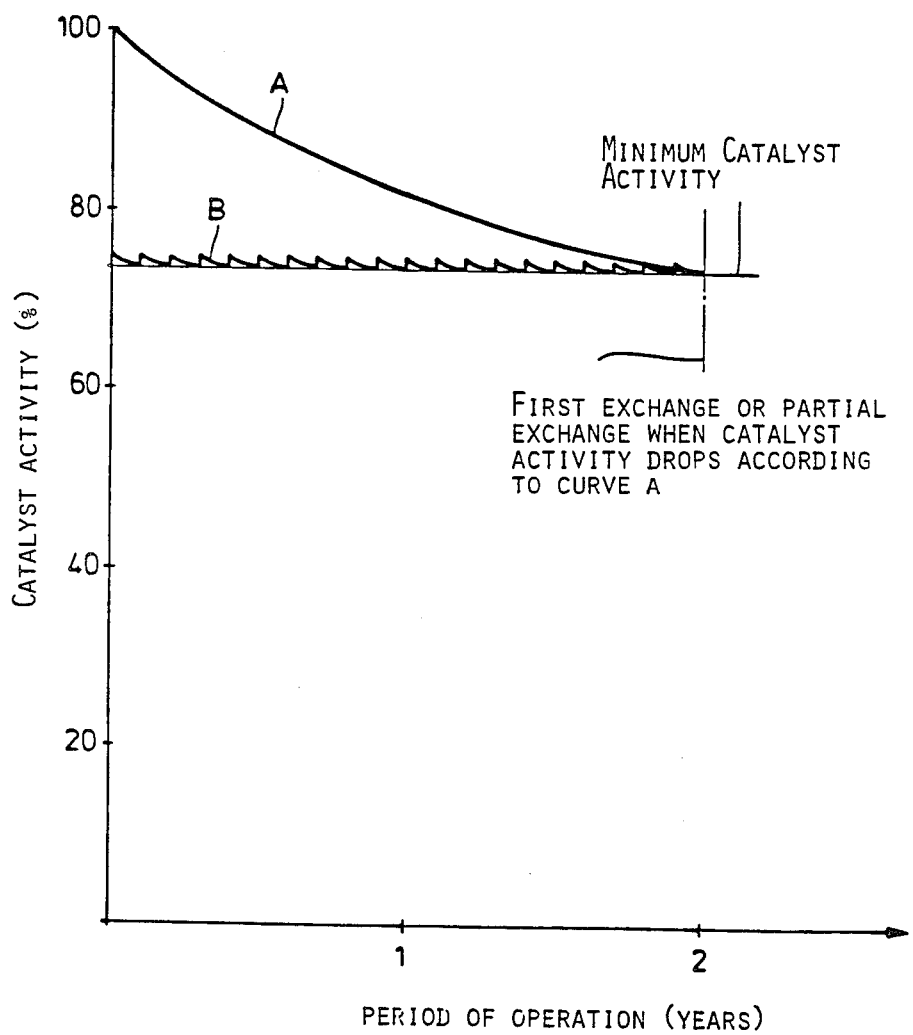
FIG. 4 is a diagram showing the catalytic activity over the period of operation.

Curve A in FIG. 4 shows the percent decrease of catalyst activity in a system according to FIG. 2. Curve B shows the catalyst activity during operation of the present invention. The activity of the system remains almost constant due to the quasi-continuous exchange of spent catalyst substance in the form of catalyst-coated heat-storage elements 2 with new or regenerated elements.

The invention now being fully described, it will be apparent to one of ordinary skill in the art that many changes and modifications can be made thereto without departing from the spirit or scope of the invention as set forth herein.

The present disclosure relates to the subject matter disclosed in German Patent Application No. P 35 36 958.2 filed on October 17th, 1985, the entire specification of which is incorporated herein by reference.

What is claimed is:

1. A method of continuously pre-heating combustion air and catalytically reducing noxious substances comprising $NO_x$ in flue gas, the method comprising:
    passing through a first portion and a second portion of a heat-exchanger a plurality of groups of heated, separately movable, heat-storage elements differing from each other in at least one physical characteristic selected from among size, shape and weight on the basis of which these groups can be separated from one another, said heat-storage elements comprising catalytically-active, catalyst-coated, heat-storage elements;
    passing combustion air through said first portion of said heat-exchanger to transfer heat from said elements to said air, and passing ammonia and heated flue gas containing at least one reducible noxious substance, which at least one reducible noxious substance comprises $NO_x$, through said second portion of said heat-exchanger to transfer heat from said flue gas to said elements while simultaneously catalytically reducing said at least one reducible noxious substance comprising $NO_x$ with said ammonia, said air and said flue gas flowing in a direction transverse to the direction of the flow of said elements and substantially in the absence of leakages of air and flue gas between said first portion and said second portion of said heat-exchanger; and
    removing said elements from said second portion of said heat-exchanger and reintroducing said elements into said first portion of said heat-exchanger, said step of removing including disposing of elements of one group removed from said heat-exchanger and substituting therefor unspent or regenerated elements of a different one of said groups as a function of the content of noxious substances in the flue gas flowing out of said heat-exchanger.

2. The method of claim 1, further comprising
    cleaning said heat-storage elements removed from said heat-exchanger.

3. The method of claim 1, further comprising
    maintaining the temperature of said catalyst-coated, heat-storage elements by heating the elements prior to the reducing step.

4. The method of claim 1, wherein said elements removed from said second portion of said heat-exchanger in the removing step are divided into a first portion and a second portion, the first portion of said elements being reintroduced into said first portion of said heat-exchanger and the second portion of said elements being reintroduced into said second portion of said heat-exchanger.

5. The method of claim 1, further comprising
    determining the content of noxious substances in said flue gas flowing out of said heat-exchanger; and
    disposing of elements from one group removed from said second portion of said heat-exchanger and introducing catalytically active elements of a different group into said heat-exchanger when the content of noxious substances is above a desired value.

6. The method of claim 5, wherein the content of $NO_x$ and $NH_3$ in said flue gas is determined.

* * * * *